(No Model.)
E. W. DEMING.
SETTLING TANK FOR SUGAR MANUFACTURE.
No. 526,518. Patented Sept. 25, 1894.
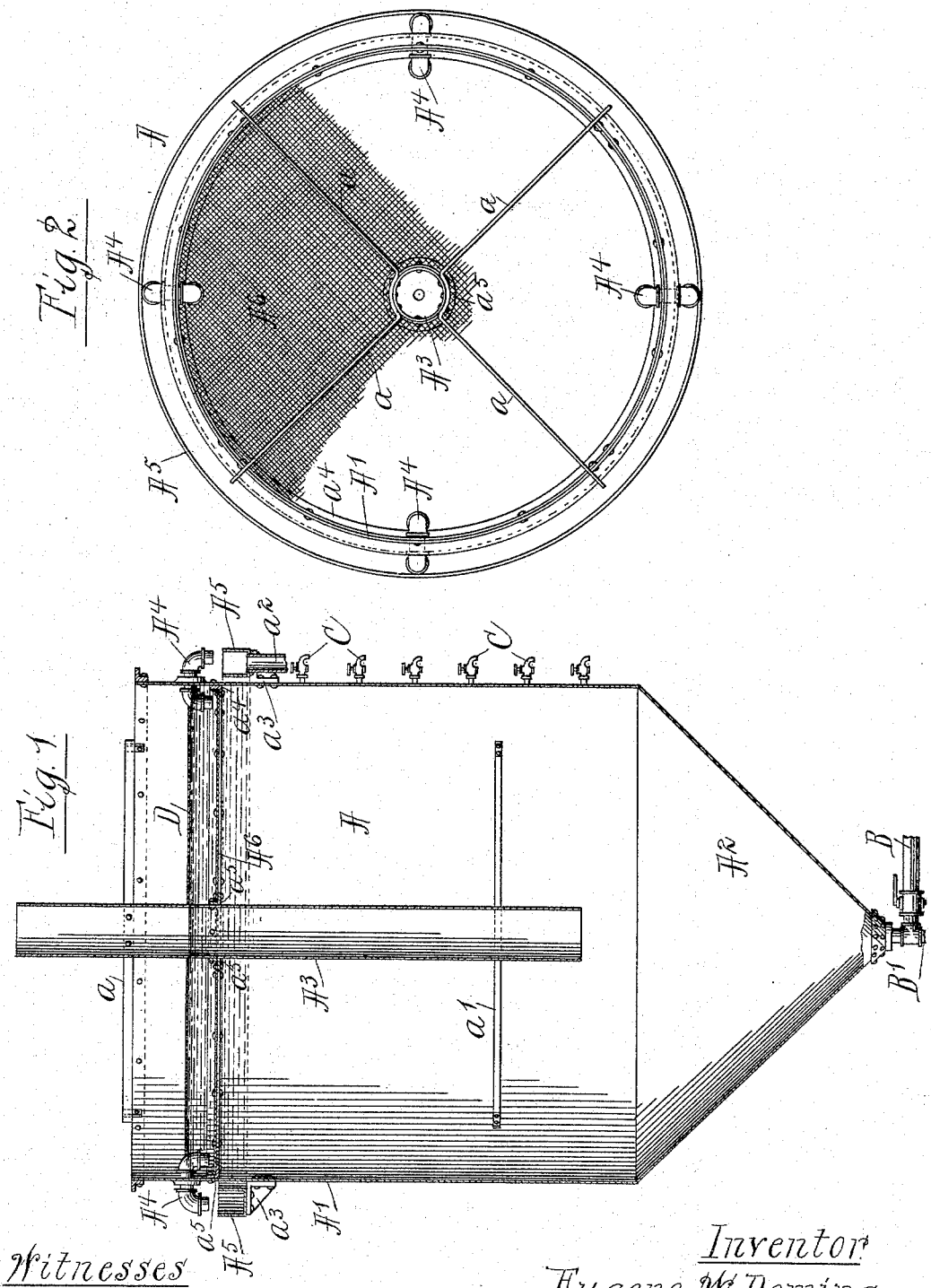
Witnesses
Jno. W. Adams
Louis M. F. Whitehead
Inventor
Eugene W. Deming
by Dayton, Poole & Brown,
his Attorneys

UNITED STATES PATENT OFFICE.

EUGENE W. DEMING, OF NEW ORLEANS, LOUISIANA.

SETTLING-TANK FOR SUGAR MANUFACTURE.

SPECIFICATION forming part of Letters Patent No. 526,518, dated September 25, 1894.

Application filed February 9, 1894. Serial No. 499,616. (No model.)

*To all whom it may concern:*

Be it known that I, EUGENE W. DEMING, of New Orleans, in the parish of Orleans and State of Louisiana, have invented certain new and useful Improvements in Settling-Tanks; and I do hereby declare that the following is a full, clear, and exact description thereof, reference being had to the accompanying drawings, and to the letters of reference marked thereon, which form a part of this specification.

This invention relates to improvements in processes of and apparatus for removing from saccharine or other solutions the impurities held in suspension therein, and it has particular reference to the removal of the matter coagulated in saccharine solutions by the application of heat and the necessary reagents thereto, in the earlier stages of the process of defecation.

My invention is designed to take advantage of the fact, known to those skilled in the art of sugar making, that impurities of the nature referred to, although they accumulate upon the surface of saccharine solutions when boiled in an open tank, are nevertheless of such specific gravity as to be readily precipitated from quiet bodies of the solution when thoroughly beaten into or mixed therewith.

To this end, therefore, in practicing my invention, I employ an overflow or top discharging settling tank sufficiently large to contain a body of solution not liable to be materially agitated by the currents normally occurring by reason of the supply and discharge of liquid to and from the tank, and provide for the introduction of the supply to the main body of liquid within the tank, in a slow moving current, preferably directed downward, and at a point relatively remote from both the top and bottom of the tank, whereby the impurities settle to the bottom of the tank while the clear liquid rises gradually and flows off at its top. In order that this operation may be maintained continuously the bottom of the tank in an approved form is made to converge downward to an outlet opening toward which the accumulating impurities will be directed and through which they may be removed contemporaneously with the passage of the solution through the tank and its clarification therein, in the manner described.

The invention consists in the matters herein set forth and particularly pointed out in the appended claims.

In the accompanying drawings, Figure 1 is a sectional elevation of a settling tank constructed in accordance with my invention. Fig. 2 is a top plan view thereof.

A designates the settling tank as a whole, the same comprising a cylindric upper portion A' provided with a conical funnel-shaped base $A^2$ converging downward to a central outlet pipe B. Supported centrally within the tank by means of braces $a$ and $a'$ is a vertical sheet metal pipe or down-take $A^3$, open at both ends, with its upper end rising above the level of the surface of the solution when the tank is full, and its lower end about midway between the outlet in the bottom and said surface level. The braces $a$ in this instance are two in number riveted about midway of their length to the down-take $A^3$ and having their ends resting upon and secured to the rim of the tank. The braces $a'$ are generally similar but engage the down-take near its lower end and are secured at their ends to the inside of the tank.

As herein shown short outlet pipes $A^4$ extending through the wall of the tank near the top thereof permit the solution to flow out of the tank as fast as it is supplied thereto, and in this instance said pipes are made of inverted U-shape in order that the outflow may be from a level slightly below the surface of the liquid, the drawing off of any scum which may accumulate upon the surface being thereby avoided. A gutter $A^5$ is arranged around the exterior of the tank just below the outer ends of the pipes $A^4$ and is provided with an outlet $a^2$ from which the clarified solution may be conducted off as desired. The diameter of said gutter in its smallest part is, in this instance, made larger than the exterior diameter of the tank in order that it may be somewhat inclined from the horizontal, and the gutter is supported upon brackets $a^3$ secured to the wall of the tank in such position as to direct the inclination downward toward that side of the apparatus at which it is considered most desirable to locate the discharge outlet $a^2$, this point being determined upon when the apparatus is in process of erection.

As a further improvement and for the purpose of preventing any particles of fiber or other impurities which have not been completely precipitated from entering the outlet pipes, a filter screen $A^6$ is herein shown provided across the body of the tank just below said outlet pipes, said screen being in this instance supported upon ledges $a^4$ and $a^5$ provided on the wall of the tank and the downtake respectively. The matters restrained by the screen thus provided accumulate on the under side thereof in the form of flakes which ultimately break off and settle to the bottom of the tank so that said screen is self-cleaning in its action. The tank is further herein shown as provided with a plurality of try cocks C by means of which the condition of the solution at various levels may be determined.

In the operation of the settling tank the solution is conducted through suitable pipes from the source of supply, as, for example, from the superheating apparatus set forth in my concurrent application, Serial No. 498,359, filed January 29, 1894, and is discharged into the open upper end of the down-take $A^3$ above the level of the liquid contained therein, so that any air or vapor mixed therewith is permitted to escape while the solution itself flows slowly downward to enter the body of the tank. On leaving the down-take the solution spreads out in all directions and becomes so widely distributed that its current is scarcely perceptible, while the coagulated impurities, already given a downward impulse by their passage through the down-take, settle to the bottom of the tank and are directed by its conical shape toward the outlet pipe B thereof. As it settles to the bottom the coagulated matter carries with it other deleterious substances held in suspension in the solution, while the clear liquid rises slowly to the top, passing through the filter screen $A^6$, as hereinbefore described, and eventually flowing out through the outlet pipes $A^4$.

The outlet pipe B leading out of the bottom of the tank will usually be connected with the suction pipe of the filter press pump which will be operated constantly or otherwise, as may be found necessary or desirable to prevent an undue accumulation of the precipitated matters, their removal being thus readily accomplished simultaneously with the flow of the solution through the tank. The apparatus is therefore adapted for continuous operation for an indefinite period, the solution with its contained impurities being constantly poured into the top of the down-take $A^3$ and drawn off through the discharge pipe $a^2$, while the impurities are removed through the pipe B as stated. Said pipe B is herein shown provided with a controlling valve $b$, and a downwardly extending branch pipe B' controlled by a suitable valve (not shown) permits the tank to be readily washed out when desired. Under normal conditions, however, there is no necessity for emptying and washing the tank except when operations are to be discontinued for many hours, in which case or whenever otherwise required the contents are discharged through the pipe B to the filters.

When the settling tank is used in connection with superheating apparatus of the character referred to, the temperature of the solution within the tank will desirably be maintained in the neighborhood of 200° Farenheit, which while far too high for fermentation, is sufficiently low to prevent any ebullition of the solution by which the precipitation of the impurities might be retarded. In order to maintain this temperature the solution may, if necessary, be covered with a blanket D of wool or other suitable light nonconducting material adapted to float upon the surface of the solution and prevent the undue loss of heat therefrom.

I claim as my invention—

1. A settling tank having a cylindric body and a conical bottom converging downward to an outlet for precipitated matter, discharge orifices at the top of the tank, an annular gutter surrounding the tank beneath said discharge orifices, a filter screen extending across the tank immediately below the discharge orifices, a central aperture in said filter screen, and an open-ended downtake located centrally of the tank and extending through said central aperture, the upper end of the downtake terminating above the upper discharge and its lower end terminating about midway of the depth of the tank, substantially as described.

2. A settling tank provided with a cylindric body and a conical bottom converging downward to an outlet for precipitated matter, inverted U-shaped discharge pipes extending through the wall of the tank near the top thereof, an annular gutter surrounding the tank beneath the outer end of said discharge pipe, a filter screen extending across the tank immediately below the inner ends of the discharge pipes, a central aperture in said screen, an open-ended downtake located centrally of the tank and extending through said central aperture of the screen, the upper end of the downtake terminating above the upper outlet pipes and its lower end terminating about midway of the depth of the tank, substantially as described.

3. A settling tank having a cylindrical body and a conical bottom converging downward to form an outlet for precipitated matter, discharge orifices at the top of the tank, an annular gutter surrounding the tank beneath said discharge orifices, a filter screen extending across the tank immediately below said discharge orifices, a central aperture in said filter screen, an open ended down-take located centrally of the tank and extending through said central aperture, the upper end of the down-take terminating above the discharge orifices and its lower end terminating about half way of the depth of the tank, and a buoyant non-conducting cover fitting the upper end of the tank, and apertured for the passage of the down-take, substantially as described.

In testimony that I claim the foregoing as my invention I affix my signature in presence of two witnesses.

EUGENE W. DEMING.

Witnesses;
CARLETON HUNT,
C. S. KELLOGG.